US008744491B2

(12) United States Patent
Tipnis et al.

(10) Patent No.: US 8,744,491 B2
(45) Date of Patent: *Jun. 3, 2014

(54) WIRELESS NETWORK TOUR GUIDE

(75) Inventors: Shilpa Tipnis, Glen Burnie, MD (US); Dara Ung, Odenton, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,156

(22) Filed: Oct. 28, 2010

(65) Prior Publication Data

US 2011/0065455 A1 Mar. 17, 2011

Related U.S. Application Data

(63) Continuation of application No. 10/023,704, filed on Dec. 21, 2001, now Pat. No. 7,853,272.

(51) Int. Cl.
*H04W 24/00* (2009.01)
*H04W 4/00* (2009.01)

(52) U.S. Cl.
USPC .......... 455/456.3; 455/456.1; 455/456.2; 455/456.5; 455/456.6; 455/466

(58) Field of Classification Search
USPC .......... 455/414.1, 414.2, 456.1–456.6, 466
See application file for complete search history.

(56) References Cited

U.S. PATENT DOCUMENTS

| 3,400,222 | A | 9/1968 | Nightingale et al. |
|---|---|---|---|
| 3,920,908 | A | 11/1975 | Kraus |
| 4,310,726 | A | 1/1982 | Asmuth |
| 4,399,330 | A | 8/1983 | Kuenzel |
| 4,680,785 | A | 7/1987 | Akiyama et al. |
| 4,725,719 | A | 2/1988 | Oncken et al. |
| 4,756,020 | A | 7/1988 | Fodale |
| 4,776,000 | A | 10/1988 | Parienti |
| 4,776,003 | A | 10/1988 | Harris |
| 4,776,033 | A | 10/1988 | Scheinert |
| 4,831,647 | A | 5/1989 | D'Avello et al. |
| 4,845,740 | A | 7/1989 | Tokuyama et al. |
| 4,852,149 | A | 7/1989 | Zwick |
| 4,852,155 | A | 7/1989 | Barraud |
| 4,860,341 | A | 8/1989 | D'Avello et al. |

(Continued)

OTHER PUBLICATIONS

Open Mobile Alliance, User Plane Location Protocol Candidate Version 1.0, OMA-TS-ULP-V1_0-20060127-C, Jan. 27, 2006, pp. 1-66.

(Continued)

*Primary Examiner* — Nathan Mitchell
(74) *Attorney, Agent, or Firm* — William H. Bollman

(57) ABSTRACT

Location based wireless services in a service provider's network are intertwined with a message database (text and/or audio) to automatically provide location information regarding the subscriber to the message database, without requiring the wireless device itself to provide the location information. A location management system is provided to perform the location management functions of determining subscriber location (e.g., by call/sector ID, angle of arrival (AOA), time difference of arrival (TDOA), time of arrival (TOA)), and of mapping the location to the desired text and/or audio. Speed information may also be determined by the location management system, or the subscriber may be prompted to input a particular mode of transportation, or generally indicate their speed. Of course, the slower the speed of the subscriber, the fewer location updates will be required, lessening the burden on the tour guide system in the wireless network.

16 Claims, 4 Drawing Sheets

(56) References Cited

U.S. PATENT DOCUMENTS

| | | | | |
|---|---|---|---|---|
| 4,901,340 | A | 2/1990 | Parker et al. | |
| 4,935,956 | A | 6/1990 | Hellworth et al. | |
| 4,951,308 | A | 8/1990 | Bishop et al. | |
| 5,003,585 | A | 3/1991 | Richer | |
| 5,046,088 | A | 9/1991 | Margulies | |
| 5,063,588 | A | 11/1991 | Patsiokas et al. | |
| 5,068,891 | A | 11/1991 | Marshall | |
| 5,103,449 | A | 4/1992 | Jolissaint | |
| 5,127,040 | A | 6/1992 | D'Avello et al. | |
| 5,128,938 | A | 7/1992 | Borras | |
| 5,138,648 | A | 8/1992 | Palomeque et al. | |
| 5,138,650 | A | 8/1992 | Stahl et al. | |
| 5,144,649 | A | 9/1992 | Zicker et al. | |
| 5,159,625 | A | 10/1992 | Zicker | |
| 5,187,710 | A | 2/1993 | Chou et al. | |
| 5,216,703 | A | 6/1993 | Roy | |
| 5,220,593 | A | 6/1993 | Zicker | |
| 5,233,642 | A | 8/1993 | Renton | |
| 5,265,155 | A | 11/1993 | Castro | |
| 5,274,802 | A | 12/1993 | Altine | |
| 5,276,444 | A | 1/1994 | McNair | |
| 5,291,543 | A | 3/1994 | Freese et al. | |
| 5,293,642 | A | 3/1994 | Lo | |
| 5,297,189 | A | 3/1994 | Chabernaud | |
| 5,301,223 | A | 4/1994 | Amadon et al. | |
| 5,301,234 | A | 4/1994 | Mazziotto et al. | |
| 5,309,501 | A | 5/1994 | Kozik et al. | |
| 5,311,572 | A | 5/1994 | Friedes et al. | |
| 5,321,735 | A | 6/1994 | Breeden | |
| 5,325,418 | A | 6/1994 | McGregor et al. | |
| 5,327,144 | A | 7/1994 | Stilp et al. | |
| 5,329,578 | A | 7/1994 | Brennan et al. | |
| 5,339,352 | A | 8/1994 | Armstrong et al. | |
| 5,341,414 | A | 8/1994 | Popke | |
| 5,351,235 | A | 9/1994 | Lahtinen | |
| 5,353,335 | A | 10/1994 | D'Urso | |
| 5,359,182 | A | 10/1994 | Schilling | |
| 5,359,642 | A | 10/1994 | Castro | |
| 5,359,643 | A | 10/1994 | Gammino | |
| 5,369,699 | A | 11/1994 | Page et al. | |
| 5,384,825 | A | 1/1995 | Dillard et al. | |
| 5,396,545 | A | 3/1995 | Nair et al. | |
| 5,396,558 | A | 3/1995 | Ishiguro et al. | |
| 5,404,580 | A | 4/1995 | Simpson et al. | |
| 5,408,513 | A | 4/1995 | Busch et al. | |
| 5,408,519 | A | 4/1995 | Pierce et al. | |
| 5,408,682 | A | 4/1995 | Ranner et al. | |
| 5,412,726 | A | 5/1995 | Nevoux et al. | |
| 5,438,615 | A | 8/1995 | Moen | |
| 5,440,621 | A | 8/1995 | Castro | |
| 5,457,737 | A | 10/1995 | Wen | |
| 5,465,289 | A | 11/1995 | Kennedy | |
| 5,469,497 | A | 11/1995 | Pierce et al. | |
| 5,485,505 | A | 1/1996 | Norman et al. | |
| 5,502,761 | A | 3/1996 | Duncan et al. | |
| 5,506,893 | A | 4/1996 | Buscher et al. | |
| 5,508,931 | A | 4/1996 | Snider | |
| 5,509,056 | A | 4/1996 | Ericsson et al. | |
| 5,513,243 | A | 4/1996 | Kage | |
| 5,517,555 | A | 5/1996 | Amadon et al. | |
| 5,517,559 | A | 5/1996 | Hayashi et al. | |
| 5,550,897 | A | 8/1996 | Seiderman | |
| 5,570,416 | A | 10/1996 | Kroll | |
| 5,577,100 | A | 11/1996 | McGregor et al. | |
| 5,579,376 | A | 11/1996 | Kennedy, III et al. | |
| 5,583,918 | A | 12/1996 | Nakagawa | |
| 5,586,175 | A | 12/1996 | Hogan et al. | |
| 5,588,009 | A | 12/1996 | Will | |
| 5,592,535 | A | 1/1997 | Klotz | |
| 5,610,972 | A | 3/1997 | Emery et al. | |
| 5,625,669 | A | 4/1997 | McGregor et al. | |
| 5,628,051 | A | 5/1997 | Salin | |
| 5,640,447 | A | 6/1997 | Fonseca | |
| 5,682,600 | A | 10/1997 | Salin | |
| 5,719,918 | A * | 2/1998 | Serbetcioguglu et al. | 380/271 |
| 5,722,067 | A | 2/1998 | Fougnies et al. | |
| 5,732,346 | A | 3/1998 | Lazaridis | |
| 5,768,509 | A | 6/1998 | Gunluk et al. | |
| 5,778,313 | A | 7/1998 | Fougnies | |
| 5,787,357 | A | 7/1998 | Salin | |
| 5,790,636 | A | 8/1998 | Marshall | |
| 5,793,859 | A | 8/1998 | Matthews | |
| 5,794,142 | A | 8/1998 | Vanttila et al. | |
| 5,797,094 | A | 8/1998 | Houde et al. | |
| 5,797,096 | A | 8/1998 | Lupien et al. | |
| 5,806,000 | A | 9/1998 | Vo et al. | |
| 5,815,816 | A | 9/1998 | Isumi | |
| 5,822,700 | A | 10/1998 | Hult et al. | |
| 5,826,185 | A | 10/1998 | Wise et al. | |
| 5,850,599 | A | 12/1998 | Seiderman | |
| 5,854,975 | A | 12/1998 | Fougnies et al. | |
| 5,889,473 | A * | 3/1999 | Wicks | 340/7.21 |
| 5,905,736 | A | 5/1999 | Ronen et al. | |
| 5,920,820 | A | 7/1999 | Qureshi | |
| 5,930,701 | A | 7/1999 | Skog | |
| 5,940,755 | A | 8/1999 | Scott | |
| 5,946,630 | A | 8/1999 | Willars et al. | |
| 5,974,133 | A | 10/1999 | Fleischer | |
| 5,983,091 | A | 11/1999 | Rodriguez | |
| 5,987,323 | A | 11/1999 | Huotari | |
| 6,026,292 | A | 2/2000 | Coppinger | |
| 6,029,062 | A | 2/2000 | Hanson | |
| 6,035,025 | A | 3/2000 | Hanson | |
| 6,038,444 | A * | 3/2000 | Schipper et al. | 455/421 |
| 6,049,710 | A | 4/2000 | Nilsson | |
| 6,064,875 | A | 5/2000 | Morgan | |
| 6,070,067 | A | 5/2000 | Nguyen | |
| 6,073,004 | A | 6/2000 | Balachandran | |
| 6,073,015 | A | 6/2000 | Berggren et al. | |
| 6,075,982 | A | 6/2000 | Donovan | |
| 6,101,378 | A | 8/2000 | Barabash et al. | |
| 6,115,458 | A | 9/2000 | Taskett | |
| 6,119,014 | A * | 9/2000 | Alperovich et al. | 455/466 |
| 6,149,353 | A | 11/2000 | Nilsson | |
| 6,157,823 | A | 12/2000 | Fougnies et al. | |
| 6,188,752 | B1 | 2/2001 | Lesley | |
| 6,195,543 | B1 | 2/2001 | Granberg | |
| 6,208,870 | B1 | 3/2001 | Lorello et al. | |
| 6,219,669 | B1 | 4/2001 | Haff | |
| 6,266,614 | B1 * | 7/2001 | Alumbaugh | 701/211 |
| 6,317,594 | B1 | 11/2001 | Gossman et al. | |
| 6,335,968 | B1 | 1/2002 | Malik | |
| 6,353,621 | B1 | 3/2002 | Boland | |
| 6,356,630 | B1 | 3/2002 | Cai et al. | |
| 6,370,242 | B1 | 4/2002 | Speers | |
| 6,370,373 | B1 | 4/2002 | Gerth | |
| 6,373,930 | B1 | 4/2002 | McConnel et al. | |
| 6,381,316 | B2 | 4/2002 | Joyce et al. | |
| 6,393,269 | B1 | 5/2002 | Hartmaier et al. | |
| 6,396,913 | B1 | 5/2002 | Perkins, III | |
| 6,397,054 | B1 | 5/2002 | Hoirup | |
| 6,397,055 | B1 | 5/2002 | McHenry et al. | |
| 6,397,064 | B1 | 5/2002 | Bridges | |
| 6,421,707 | B1 * | 7/2002 | Miller et al. | 709/206 |
| 6,442,257 | B1 | 8/2002 | Gundlach | |
| 6,456,852 | B2 | 9/2002 | Bar et al. | |
| 6,473,622 | B1 * | 10/2002 | Meuronen | 455/466 |
| 6,480,710 | B1 | 11/2002 | Laybourn | |
| 6,483,907 | B1 | 11/2002 | Wong et al. | |
| 6,487,180 | B1 * | 11/2002 | Borgstahl et al. | 370/310 |
| 6,487,602 | B1 * | 11/2002 | Thakker | 709/230 |
| 6,490,450 | B1 | 12/2002 | Batni et al. | |
| 6,496,690 | B1 | 12/2002 | Cobo et al. | |
| 6,505,046 | B1 | 1/2003 | Baker | |
| 6,512,930 | B2 | 1/2003 | Sandegren | |
| 6,526,351 | B2 * | 2/2003 | Whitham | 701/211 |
| 6,529,593 | B2 | 3/2003 | Nelson | |
| 6,529,732 | B1 | 3/2003 | Vainiomaki et al. | |
| 6,587,688 | B1 | 7/2003 | Chambers et al. | |
| 6,609,004 | B1 * | 8/2003 | Morse et al. | 455/456.5 |
| 6,621,810 | B1 | 9/2003 | Leung | |
| 6,731,943 | B1 | 5/2004 | McCormick | |
| 6,879,835 | B2 * | 4/2005 | Greene et al. | 455/456.1 |
| 6,985,742 | B1 * | 1/2006 | Giniger et al. | 455/456.1 |

(56) References Cited

U.S. PATENT DOCUMENTS

| | | | |
|---|---|---|---|
| 6,993,325 B1 | 1/2006 | Waesterlid | |
| 7,072,665 B1* | 7/2006 | Blumberg et al. | 455/456.1 |
| 7,088,683 B2* | 8/2006 | Sawada et al. | 370/252 |
| 7,110,773 B1 | 9/2006 | Wallace | |
| 7,120,418 B2 | 10/2006 | Herajarvi | |
| 7,240,108 B2* | 7/2007 | Smith et al. | 709/223 |
| 7,386,588 B2 | 6/2008 | Mousseau | |
| 8,300,529 B2 | 10/2012 | Strub | |
| 2001/0034224 A1 | 10/2001 | McDowell et al. | |
| 2001/0040949 A1 | 11/2001 | Blonder | |
| 2002/0013153 A1* | 1/2002 | Wilcock et al. | 455/456 |
| 2002/0068546 A1 | 6/2002 | Plush et al. | |
| 2002/0093435 A1* | 7/2002 | Baron | 340/995 |
| 2002/0103762 A1 | 8/2002 | Lopez | |
| 2002/0168986 A1 | 11/2002 | Lau et al. | |
| 2002/0183072 A1* | 12/2002 | Steinbach et al. | 455/456 |
| 2003/0008661 A1* | 1/2003 | Joyce et al. | 455/456 |
| 2003/0022664 A1* | 1/2003 | Goldstein | 455/420 |
| 2003/0058096 A1 | 3/2003 | Shteyn | |
| 2003/0060212 A1 | 3/2003 | Thomas | |
| 2003/0086422 A1 | 5/2003 | Klinker et al. | |
| 2003/0155413 A1* | 8/2003 | Kovesdi et al. | 235/375 |
| 2003/0187803 A1 | 10/2003 | Pitt | |
| 2003/0210656 A1 | 11/2003 | Biacs | |
| 2004/0176104 A1 | 9/2004 | Arcens | |
| 2005/0048948 A1 | 3/2005 | Holland et al. | |
| 2005/0239480 A1 | 10/2005 | Kim et al. | |
| 2005/0250516 A1 | 11/2005 | Shim | |
| 2005/0265536 A1 | 12/2005 | Smith | |
| 2006/0030337 A1 | 2/2006 | Nowak | |
| 2006/0036680 A1 | 2/2006 | Shim | |
| 2006/0058042 A1 | 3/2006 | Shim | |
| 2006/0063536 A1 | 3/2006 | Kim | |
| 2006/0079249 A1 | 4/2006 | Shim | |
| 2006/0225090 A1 | 10/2006 | Shim | |
| 2006/0274696 A1 | 12/2006 | Krishnamurthi | |
| 2007/0037585 A1 | 2/2007 | Shim | |
| 2007/0037586 A1 | 2/2007 | Kim | |
| 2007/0072624 A1 | 3/2007 | Niemaenmaa | |
| 2007/0082681 A1 | 4/2007 | Kim | |
| 2007/0082682 A1 | 4/2007 | Kim | |
| 2007/0110076 A1 | 5/2007 | Brouwer | |
| 2007/0167177 A1 | 7/2007 | Kraufvelin | |
| 2007/0182547 A1 | 8/2007 | Wachter | |
| 2007/0243885 A1 | 10/2007 | Shim | |
| 2008/0081646 A1 | 4/2008 | Morin | |
| 2008/0109650 A1 | 5/2008 | Shim | |
| 2011/0009086 A1 | 1/2011 | Poremba | |
| 2011/0064205 A1 | 3/2011 | Boni | |

OTHER PUBLICATIONS

Open Mobile Alliance, Secure User Plane Location Architecture Candidate Version 1.0, OMA-AD-SUPL-V1 0-20060127-C, Jan. 27, 2006, pp. 1-80.

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

International Search Report received in PCT/US2012/062204 dated Jan. 9, 2013.

* cited by examiner

WIRELESS NETWORK TOUR GUIDE

The present application is a continuation of U.S. application Ser. No. 10/023,704, entitled "WIRELESS NETWORK TOUR GUIDE", filed Dec. 21, 2001, now U.S. Pat. No. 7,853,272 the entirety of which is expressly incorporated herein by reference.

BACKGROUND OF THE INVENTION

1. Field of the Invention

This invention relates generally to the field of wireless telecommunications. More particularly, it relates to a system and method for implementing a tour guide system in a wireless phone network.

2. Background of Related Art

Conventional wireless tour guide systems are typically local systems, e.g., walkie-talkies. For instance, currently existing solutions use a specialized walkie-talkie device and an in-house information database to retrieve information for users based on keypad input then transmit analog voice bites using short range walkie-talkie technologies. The walkie-talkies are typically rented and returned at each tourist location of interest.

Such walkie-talkie type systems typically require manual input from the user, e.g., via keypad entry, which is sent to the content end, which then determines which sound bite to retrieve, download in return and play.

Other tour guide systems require location information to be input by a user, or determined by equipment such as a global positioning satellite (GPS) receiver in the mobile unit, using a dial-up connection through the public switched telephone network (PSTN) for selecting and downloading analog voice information. For instance, U.S. Pat. No. 6,199,045 to Giniger et al. ("Giniger") teaches the provision of position-related information by mobile devices uploaded to a central cite server. The central cite server uses the received position information sent by the mobile device, retrieves corresponding response information from a table, and plays the retrieved response information over a telephone line back to the mobile unit. (See, e.g., Giniger Abstract and FIG. 5).

Just as in the conventional walkie-talkie systems, systems such as Giniger require location information to be determined and/or provided directly by the mobile device to a central server over the PSTN. For instance, as Giniger explains, a global positioning satellite (GPS) in the mobile device itself determines a location of the subscriber, which is uploaded to the central cite server over the PSTN for direction as to the desired sound bite to be retrieved and downloaded back to the mobile device via the PSTN.

While these tour guide systems are useful, they require either costly specialized components (e.g., a GPS receiver), or manual input from the user, requiring the user to look away from their tourist attraction. These disadvantages either increase costs of the tourist held devices and/or generally distract the user from the overall tour guide experience.

There is a need for a tour guide system which does not require costly specialized components, and/or importantly which does not require location information to be uploaded directly by the mobile device itself.

SUMMARY OF THE INVENTION

A method of providing tour guide information in a wireless network in accordance with the principles of the present invention comprises the usage of an existing location determination service, and identifying a short message relating to the location or identifying a voice interaction via an Interactive Voice Response Unit (IVRU). The identified short message is transmitted to the subscriber substantially while the subscriber remains at the determined location. Depending on the change of location of the subscriber, which in turn depends on the speed of the mode of transportation, location update information can be obtained.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, location based wireless services in a service provider's network are commissioned and intertwined with a message database (text and/or audio) to automatically provide location information regarding the subscriber to the message database, without requiring the wireless device itself to provide the location information.

The present invention utilizes location based wireless technology in a wireless network to automate a tour guide process with respect to a wireless device.

Figure 1:
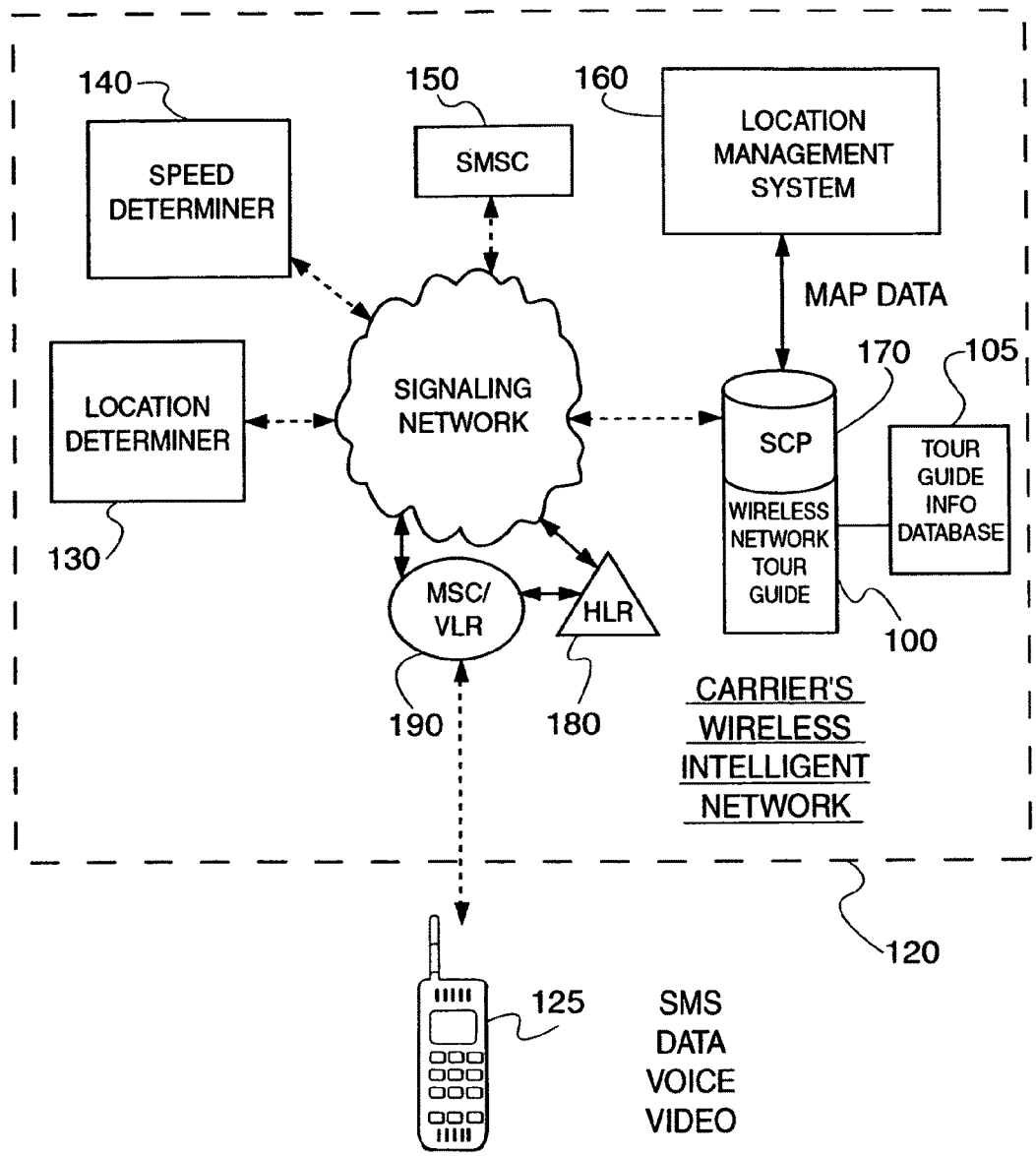
FIG. 1 shows a wireless network tour guide application resident in an SCP of a carrier's wireless intelligent network, in accordance with the principles of the present invention.

FIG. 1 shows a wireless network tour guide application resident in an SCP of a carrier's wireless intelligent network, in accordance with the principles of the present invention.

In particular, as shown in FIG. 1, an SCP 170 of a carrier's wireless intelligent network 120 is adapted to include a wireless network tour guide manager application 100. The tour guide manager via the "Interactive Voice Response Unit (IVRU)" 100 periodically requests location information relating to a predefined "point of interest", e.g., relating to a place of historical or geographical importance, with respect to a particular subscriber requesting tour guide information. Using the location information obtained automatically within a wireless network 120, the tour guide manager 100 obtains tour guide information related to that location.

In particular, the tour guide manager 100 communicates with a location management system 160, a location determiner 130, and a speed determiner 140, all in the wireless carrier's network. The wireless network 120 of the disclosed embodiment further includes a Short Message Service Center (SMSC) 150, Message Servicing Center (MSC) with Visitors Location Register (VLR) 190 and Home Location Register (HLR) 180.

The wireless network tour guide 100 in accordance with the principles of the present invention utilizes location information determined by a location determiner 130 to determine a proximate location of a wireless user, and then uses that location information to retrieve text and/or voice information from a tour guide information database 105.

Figure 2:
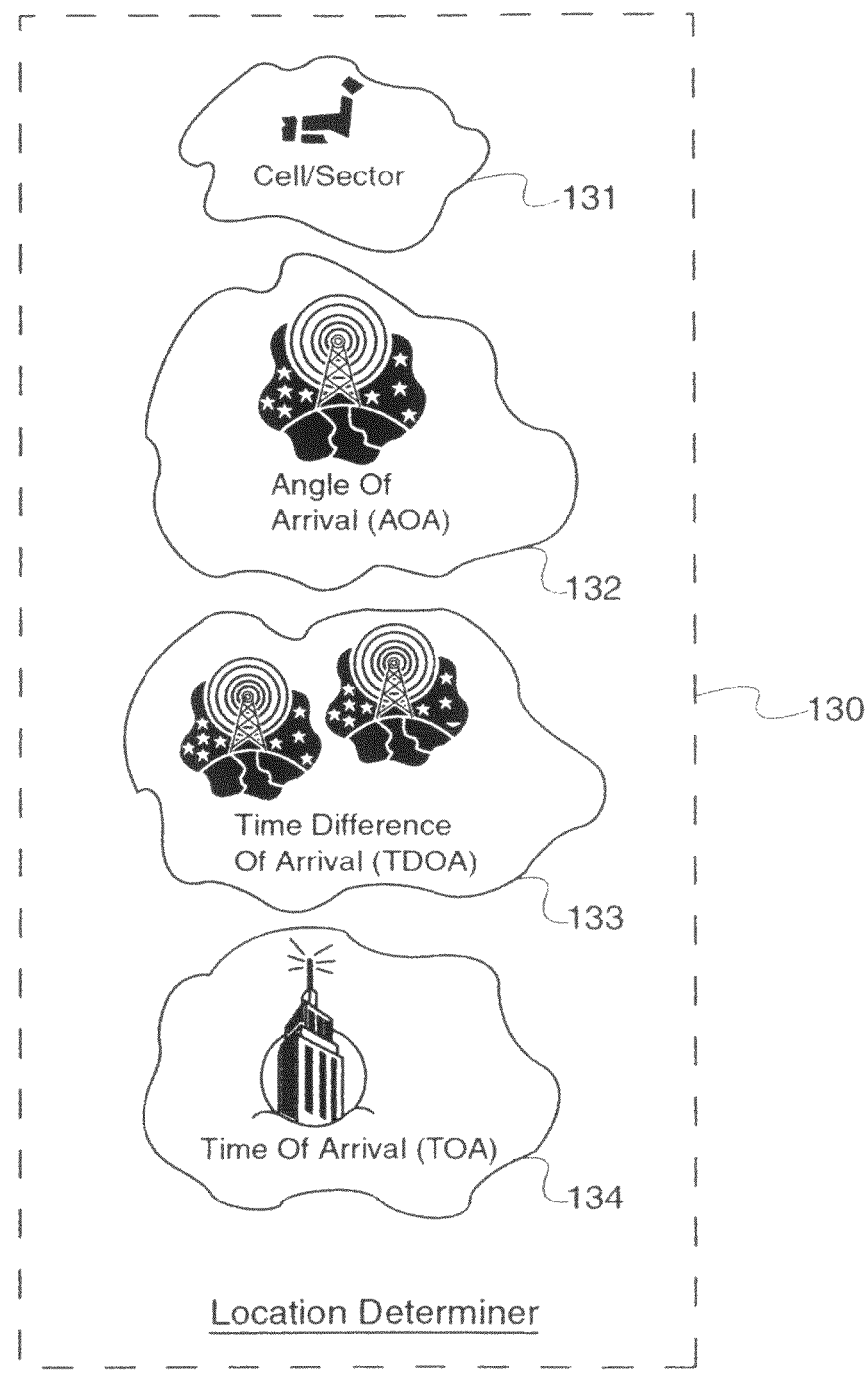
FIG. 2 depicts various embodiments of a location determiner shown in FIG. 1.

FIG. 2 depicts various embodiments of a location determiner 130 shown in FIG. 1.

In particular, as shown in FIG. 2, the location determiner 130 and location management system 160 perform the location management functions of determining subscriber location. Exemplary techniques implemented in the location determiner 130 are call/sector ID 131, angle of arrival (AOA) 132, time difference of arrival (TDOA) 130, time of arrival (TOA) 134, all of which are otherwise known in the art.

Returning to FIG. 1, location information is determined by the location determiner 130 at the wireless network (not in the wireless device) and provided to the wireless network tour guide 100, which in turn maps the location information to desired text and/or audio information, e.g., via a short message. While the desired tour guide text and/or audio information is provided to the wireless device 125 via a short message in the disclosed embodiment, the present invention relates equally to the provision of text and/or audio information outside a short messaging system.

Speed information may optionally be determined by the location management system of the wireless network 120, to augment the tour guide experience. For instance, the slower the speed of the subscriber, the fewer location updates will be required, lessening the burden on the tour guide manager 100 in the wireless network.

The speed determiner may determine speed of a wireless device (e.g., walking tour, driving tour, flying tour, etc.) inferentially. For instance, a location and time history may be maintained by the location management system 160 with respect to particular subscribers utilizing the wireless network tour guide 100. A generalized determination of speed may be sufficient for many applications, e.g., whether the wireless device acts as if it is consistent with a walking subscriber, driving subscriber, biking subscriber, flying subscriber, etc.

The subscriber utilizing the wireless network tour guide 100 may alternatively be prompted by the wireless network tour guide 100 to manually (or audibly) input a particular mode of transportation, generally indicate whether their speed is less than or greater than a given speed, e.g., less than 5 miles/hour (e.g., walking) or more than 5 miles/hour (e.g., biking, driving, etc.) As a result, if the speed of the wireless device is less than 5 miles/hour, the interval between location update requests by the location management system 160 and wireless network tour guide 100 can be enlarged.

Voice recognition may be implemented in the carrier's wireless network 120 (e.g., accessible to the SCP 170) to simplify a user's input of relevant information, e.g., in navigating through the IVR menu. For instance, a user can speak the name or other identifying feature of the point of interest to obtain faster information.

Figure 3:
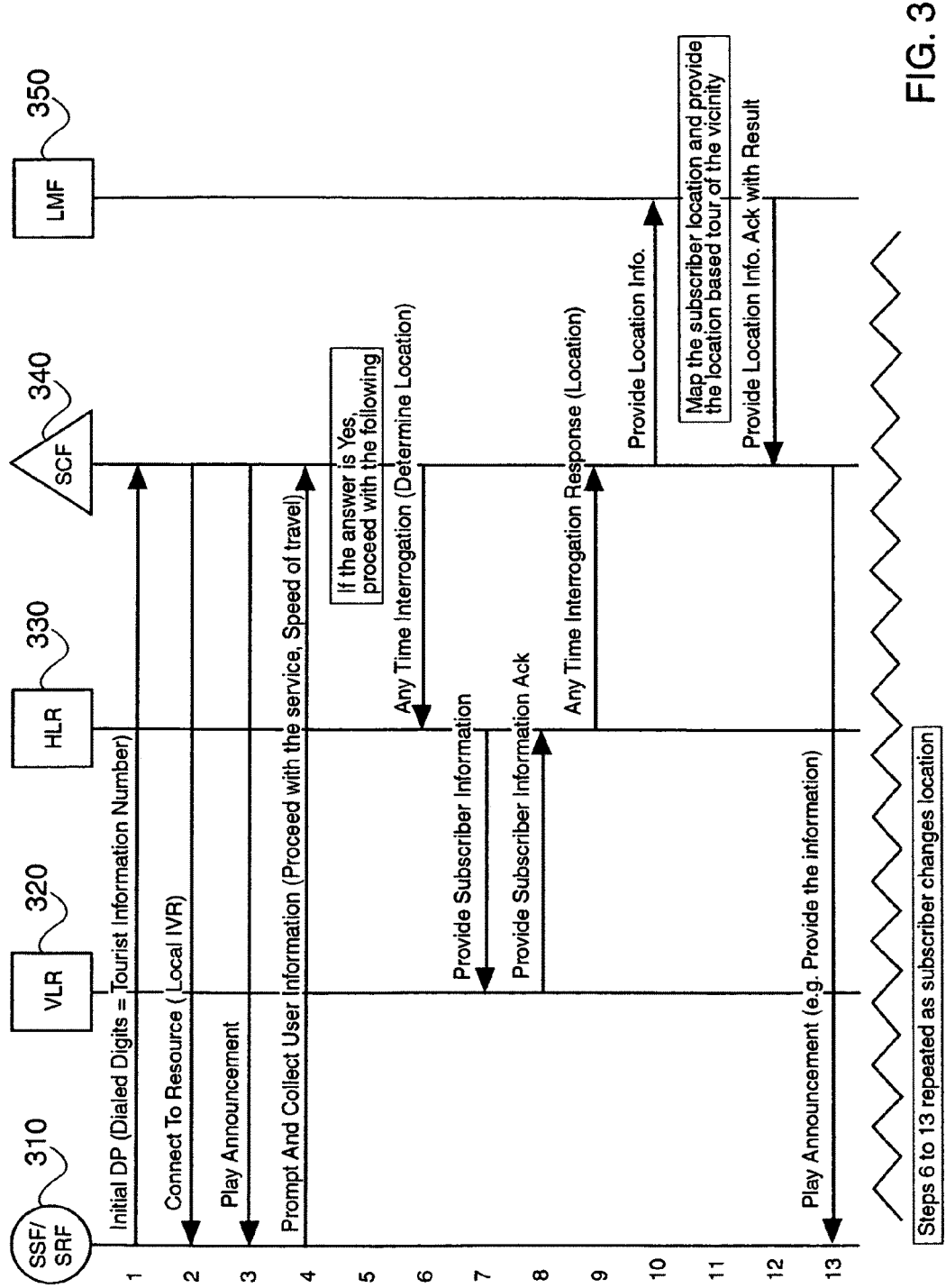
FIG. 3 shows an exemplary message flow between a wireless network tour guide system and a relevant wireless device, in accordance with the principles of the present invention.

FIG. 3 shows an exemplary message flow between a wireless network tour guide system and a relevant wireless device, in accordance with the principles of the present invention, to provide voice based information.

In particular, when the particular subscriber is ready to make a call, the option for the tour guide service may be provided as shown in the call flow diagram of FIG. 3.

The messages shown in the call flow diagram of FIG. 3 are specific to GSM CAMEL Phase 2. But any protocol (e.g. ANSI-41, WIN standards) can be used to provide the same functionality.

In FIG. 3, messages are passed between a Service Switching Function (SSF)/Service Resource Function (SRF) 310, a VLR 320, an HLR 330, a Service Control Function (SCF) 340, and a Location Management Function (LMF) 350.

The SSF/SRF 310 refers to a wireless network including a wireless network tour guide manager 100 and related location/tour guide functionality, e.g., as shown and described with respect to FIG. 1.

The LMF 350 refers to the location management system 160, which provides tour guidance information, and to the wireless network tour guide manager 100, which maps the location of the wireless device provided by the SCF 340. The location information determined by the wireless network 120 can be as approximate or accurate as possible, based upon the particular application and needs. Of course, the particular location determination technique 131-134 implemented in the location determiner 130 will largely dictate the accuracy of the location of the touring subscriber.

As shown in message 1 of FIG. 3, an InitialDP message is sent by the SSF/SRF 310 to the wireless network tour guide manager 100, to indicate the desirability of a particular subscriber to activate tour guidance. The dialed digits preferably relate to a particular activation code for tour guidance.

In message 2, a connection to the wireless network tour guide manager 100 is established by the relevant wireless device 125.

In message 3, an announcement may be played to the subscriber 125, e.g., welcoming them to the tour guide mode.

In message 4, user information is collected by the wireless network tour guide manager 100 (e.g., authorization to receive tour guidance, etc.)

In message 5, the subscriber is prompted for a "Yes" indication, indicating their desire to receive tour guidance information.

In message 6, an AnyTimeInterrogation message is transmitted between the SCF 340 and the HLR 330.

In message 7, a ProvideSubscriberInformation signal is transmitted by the HLR 330 to the VLR 320 (for roaming subscribers).

In message 8, a ProvideSubscriberInformationAck signal is returned by the VLR 320 to the HLR 330 (for roaming subscribers).

In message 9, location information relating to the relevant touring subscriber is passed by the HLR 330 to the SCF 340.

In message 10, the subscriber's location is provided by the SCF 340 to the LMF 350.

Message(s) 11 map the subscriber's location and determine the desired text and/or audio tour guide information.

In message 12, the result is returned by the LMF 350 to the SCF 340 with an acknowledgement.

In message 13, the tour guidance is transmitted from the SCF 340 to the wireless device and displayed and/or played.

The present invention provides many advantages to both the wireless network service provider as well as their subscribers. For instance, the implementation of a tour guide manager 100 within a wireless network saves consumers money, as they need not hire a personal tour guide when moving about a new city. Moreover, the subscriber's can tour at their own pace, with the location management system 160 automatically determining the pace of movement of the subscriber (without the need for manual input from the touring subscriber). The wireless manager tour guide 100 has the ability to integrate tour guidance with wireless devices which already are in the possession of many people, and thus historical knowledge can be made a part of our everyday lives.

From the perspective of the service provider, use of a wireless device for tour guidance has the ability to increase minutes of use by their subscribers, and thus can lead directly to increased revenues.

With respect to a roaming subscriber, the roaming subscriber preferably receives tour guide information from the Carrier providing service.

Use of location-based services, rather than a location determining technique or apparatus at the wireless device itself, saves costs in the wireless devices (e.g., no GPS receiver required), and/or as compared to conventional walkie-talkie type tour guide systems, provides automated determination of the location of the subscriber without bother to the user themself.

A pause and update button may be implemented in the wireless device, or a particular key sequence on the standard keypad of a mobile phone, may be used to pause active provision of the tour guide information so as to save battery power by suspension of position updates and provide general convenience to the user, which would be applicable to a voice based application. A pause feature could also be applicable to an SMS based application.

Figure 4:
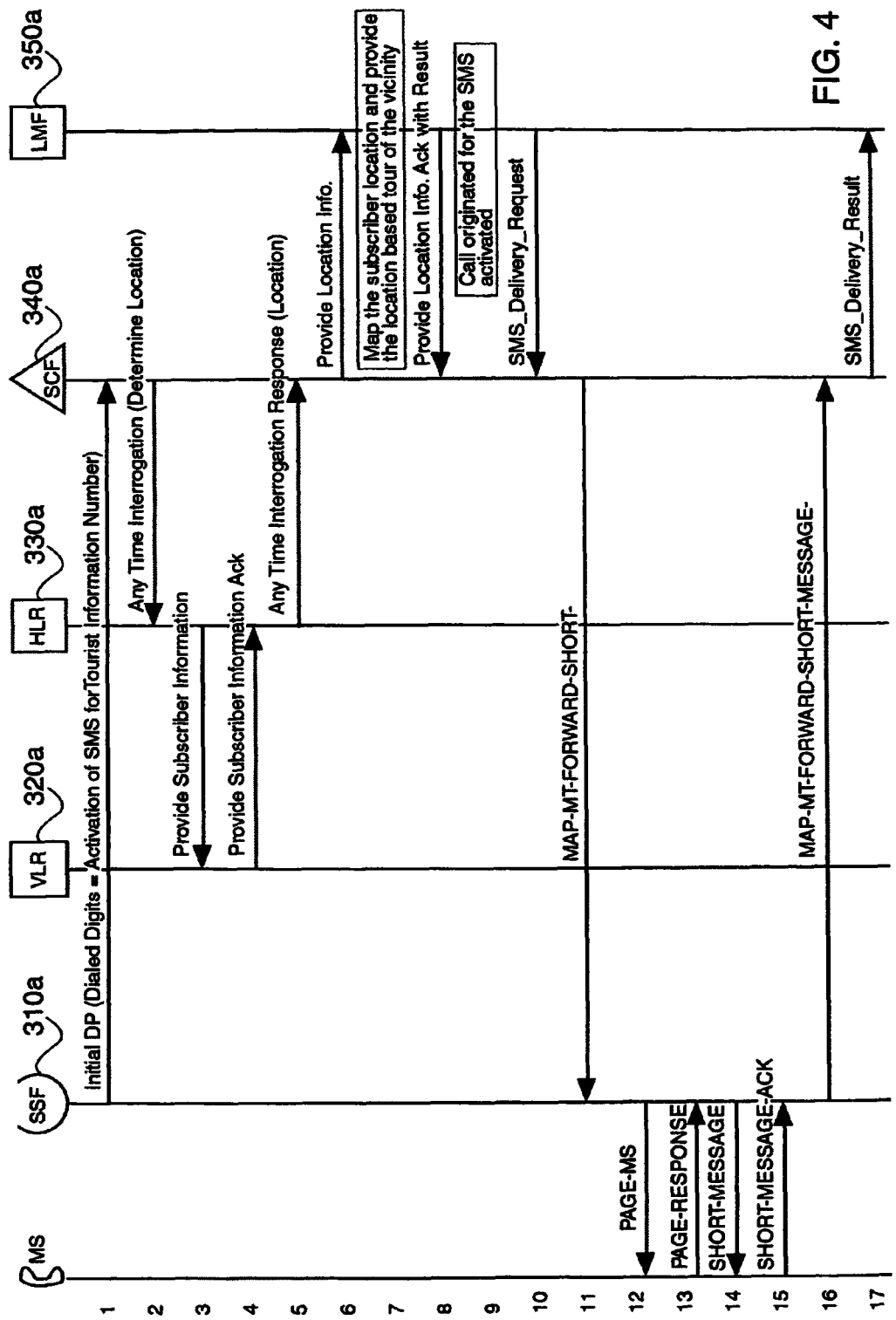
FIG. 4 shows an exemplary message flow showing the use of a Short Message by a wireless network tour guide system, in accordance with the principles of the present invention.

FIG. 4 shows an exemplary message flow showing the use of a Short Message by a wireless network tour guide system, in accordance with the principles of the present invention.

In particular, as shown in FIG. 4, a call originated by the a mobile subscriber is used to start the SMS service (the dialed digits relate to an activation code for tour guidance). An InitialDP message is sent by the SSF to the wireless network tour guide manager, to indicate the desirability of a particular subscriber to activate tour guidance.

Location information relating to the relevant touring subscriber is passed by the HLR to the SCF or can be obtained from the InitialDP message (or Origination Request(OR-REQ) message in case of an ANSI network).

The tour guidance is transmitted from the SCF to the wireless device via a short message and displayed. Steps 10 to 17 can be repeated until all information is delivered. While the present invention has been described with respect to audio guidance, the principles of the present invention relate equally to tour guidance given over a wireless phone using short messaging a short text message of, e.g., no more than 255 characters at each point of guidance. The short messaging may be combined with audio passages based on the particular application.

While the invention has been described with reference to the exemplary embodiments thereof, those skilled in the art will be able to make various modifications to the described embodiments of the invention without departing from the true spirit and scope of the invention.

What is claimed is:

1. A method of providing location based information in a wireless network, comprising:
   obtaining a location of a mobile wireless device;
   identifying a text message payload relating to said location;
   altering a length of text in said text message payload based on a speed of said mobile wireless device; and
   transmitting through a wireless network said identified altered length text message payload to said mobile wireless device.

2. The method of providing location based information in a wireless network according to claim 1, further comprising:
   determining, with said wireless network tour guide system, a speed of said mobile wireless device.

3. The method of providing location based information in a wireless network according to claim 1, wherein:
   said identified altered length text message payload is transmitted via a short messaging system.

4. The method of providing location based information in a wireless network according to claim 1, wherein:
   said location of said mobile wireless device is determined using an angle of arrival of a wireless signal from said mobile wireless device.

5. The method of providing location based information in a wireless network according to claim 1, wherein:
   said location of said mobile wireless device is determined using a time difference of arrival of wireless signals from said mobile wireless device.

6. The method of providing location based information in a wireless network according to claim 1, wherein:
   said location of said mobile wireless device is determined using time of arrival of a wireless signal from said mobile wireless device.

7. The method of providing location based information in a wireless network according to claim 1, wherein:
   said location of said mobile wireless device is determined using a known location of a cell/sector servicing said mobile wireless device.

8. The method of providing location based information in a wireless network according to claim 1, further comprising:
   maintaining said identified altered length text message payload in a short messaging system.

9. A system for providing location based information in a wireless network, comprising:
   a location determiner to obtain a location of a mobile wireless device;
   a wireless network tour guide system to identify a text message payload relating to said location and to alter a length of text in said text message payload based on a speed of said mobile wireless device; and
   a transmitter to transmit said identified altered length text message to said mobile wireless device.

10. The system for providing location based information in a wireless network according to claim 9, further comprising:
    a speed determiner to determine a speed of said mobile wireless device.

11. The system for providing location based information in a wireless network according to claim 9, further comprising:
    a short messaging system to maintain said identified altered length text message payload.

12. The system for providing location based information in a wireless network according to claim 9, wherein:
    said location of said mobile wireless device is determined using an angle of arrival of a wireless signal from said mobile wireless device.

13. The system for providing location based information in a wireless network according to claim 9, wherein:
    said location of said mobile wireless device is determined using a time difference of arrival of wireless signals from said mobile wireless device.

14. The system for providing location based information in a wireless network according to claim 9, wherein:
    said location of said mobile wireless device is determined using time of arrival of a wireless signal from said mobile wireless device.

15. The system for providing location based information in a wireless network according to claim 9, wherein:
    said location of said mobile wireless device is determined using a known location of a cell/sector servicing said mobile wireless device.

16. The system for providing location based information in a wireless network according to claim 9, further comprising:
    a short messaging system to maintain said identified altered length text message payload.

* * * * *